United States Patent
Rosenwald et al.

(10) Patent No.: US 8,468,179 B1
(45) Date of Patent: Jun. 18, 2013

(54) CONFIGURABLE VIEWS FOR A DATABASE

(75) Inventors: Guy Rosenwald, Ra'anana (IL); Uri Haham, Karkur (IL); Gary Machol, Kfar Saba (IL)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/329,730

(22) Filed: Dec. 19, 2011

(51) Int. Cl.
*G06F 7/00* (2006.01)

(52) U.S. Cl.
USPC .......................................... 707/807; 707/809

(58) Field of Classification Search
None
See application file for complete search history.

(56) References Cited

U.S. PATENT DOCUMENTS 7,693,917 B2 * 4/2010 Charlot et al. ................ 707/804
7,720,804 B2 * 5/2010 Fazal et al. .................... 707/601

* cited by examiner

*Primary Examiner* — Robert Beausoliel, Jr.
*Assistant Examiner* — Nirav K Khakhar
(74) *Attorney, Agent, or Firm* — Buckley, Maschoff & Talwalkar LLC

(57) ABSTRACT

According to some embodiments, a business enterprise platform may install a database associated with a customer of the business enterprise platform. The business enterprise platform may then provide to the customer at least one pre-defined configurable view of the information in the database. Moreover, customization of the pre-defined configurable view of the information in the database by the customer and/or a service provider may be automatically facilitated.

20 Claims, 8 Drawing Sheets

CONFIGURABLE VIEWS FOR A DATABASE

FIELD

Some embodiments relate to databases, such as those supported by a business process platform. More specifically, some embodiments relate to configurable views for a database.

BACKGROUND

A business enterprise platform may install one or more databases for a customer. The databases may, for example, contain business information such as employee data, sales data, etc. In some cases, the customer may wish to share information from the database with various service providers. For example, the customer might want a service provider to analyze or test information in the customer's database. Note that a customer might want to share different portions of the database with different service providers. For example, one service provider might need to access employee salary information while another service provider does not need that information. Moreover, even when a customer wants to share the same portion of the database with different service providers, it might be desirable to share that portion in different ways. For example, a customer might want to encrypt information in the database using different passwords for different service providers.

To achieve such abilities, the customer or business enterprise platform can write detailed code in view of the needs of the customer and/or service providers. Such an approach, however, can be time consuming and expensive—especially when there are a relative large number of customers and/or service providers to deal with (and, similarly, when the databases involved are relatively large). Moreover, these actions may be costly in connection with both resources and processing time and often require knowledge of Structured Query Language ("SQL") techniques as well as an understanding of how the customer's databases are arranged.

Accordingly, an efficient mechanism for representing and implementing different views of a database may be addressed by some embodiments herein.

DETAILED DESCRIPTION

Figure 1:
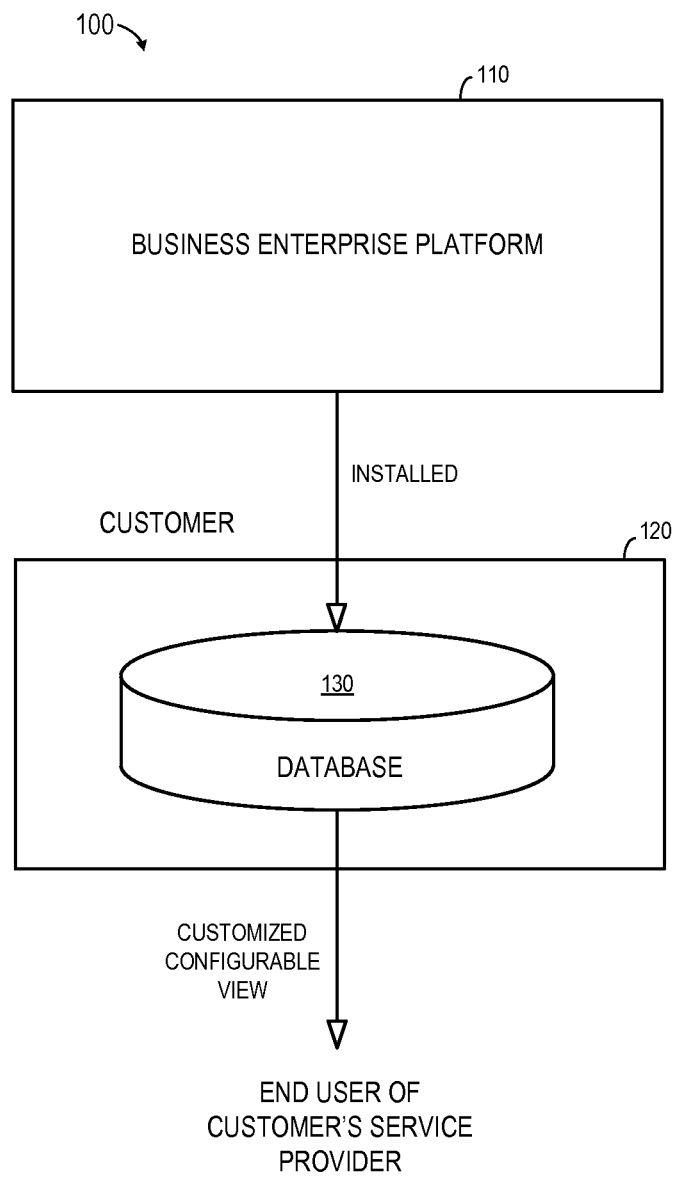
FIG. 1 is a block diagram of a system suitable for supporting various aspects of the present disclosure.

A business enterprise platform may install one or more databases for a customer. The databases may, for example, contain business information such as employee data, sales data, etc. FIG. 1 is a block diagram of a system 100 suitable for supporting various aspects of the present disclosure. In particular, the system 100 includes a business enterprise platform 110 that has installed a database 130 at or for a customer 120.

In some cases, the customer 120 may wish to share information from the database 130 with various end users associated with service providers. For example, the customer 120 might want a service provider to analyze or test information in the customer's database 130. Note that a customer 120 might want to share different portions of the database 130 with different service providers. For example, one service provider might need to access employee salary information while another service provider does not need that information. Moreover, even when the customer 120 wants to share the same portion of the database 130 with different service providers, it might be desirable to share that portion in different ways. For example, the customer 120 might want to encrypt information in the database 130 using different passwords for different service providers.

To achieve such abilities, the customer 120 or business enterprise platform 110 can write detailed code in view of the needs of the customer and/or service providers. Such an approach, however, can be time consuming and expensive—especially when there are a relative large number of customers 120 and/or service providers to deal with (and, similarly, when the databases 130 involved are relatively large). Moreover, these actions may be costly in connection with both resources and processing time and often require knowledge of SQL techniques as well as an understanding of how the customer's databases 130 are arranged.

Figure 2:
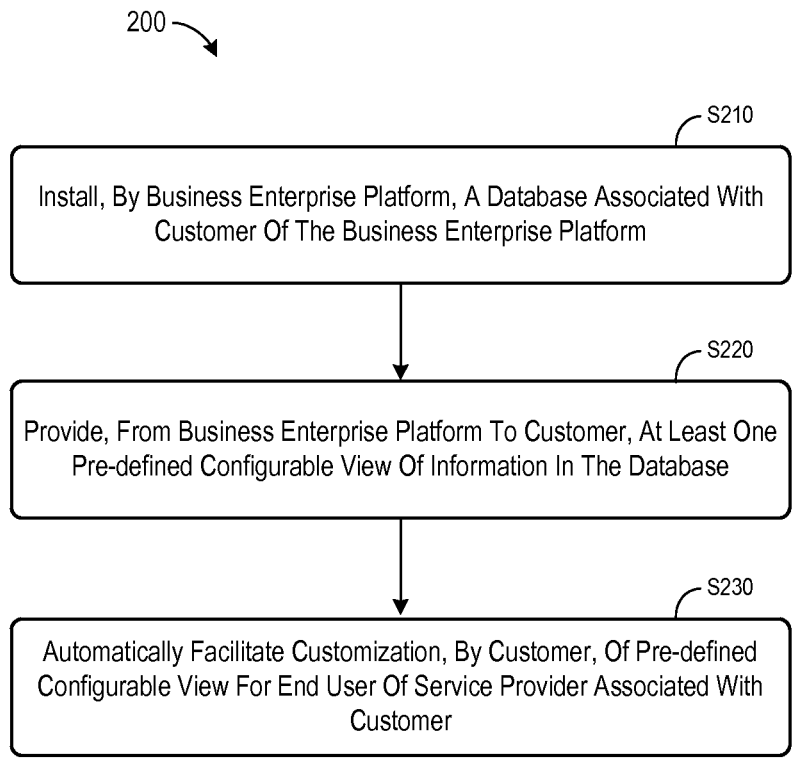
FIG. 2 is a flow diagram illustrating various aspects of the present disclosure, in accordance with some embodiments.

Accordingly, an efficient mechanism for representing and implementing different views of the database 130 may be addressed by some embodiments herein. Consider, for example, FIG. 2 which illustrates a method 200 that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a business enterprise platform may install a database associated with a customer of the business enterprise platform. The database may contain business information, such as data about sales orders, purchase orders, etc. At S220, the business enterprise platform may provide to the customer at least one pre-defined "configurable" view of the information in the database. As used herein, a view of information in a database is "configurable" if a customer or service provider is able to adjust the view in various ways.

At S230, customization of the pre-defined configurable view of the information in the database by the customer may be automatically facilitated for an end user of a service provider. According to some embodiments, this customizing may be associated data security, a scrambling operation, data encryption, and/or a randomization function (e.g., to obscure credit card numbers). For example, the customizing might be associated with a service provider's password and/or user name.

According to other embodiments, the customizing is associated a localization of information in the database (e.g., changing "England" to "USA"), a correction or standardization of information in the database (e.g., changing "US" to "USA"), a removal of information in the database, a replacement of information in the database, and/or (v) a database join operation. According to still other embodiments, the customizing might be associated with a data filtering operation, such as a column-based filter, a row-based filter, and/or a filter rule.

Note that the customization of the configurable view may be performed by the customer. According to some embodiments, a service provider might customize the configurable view (e.g., instead of, or in addition to, the customer's customization).

Figure 3:
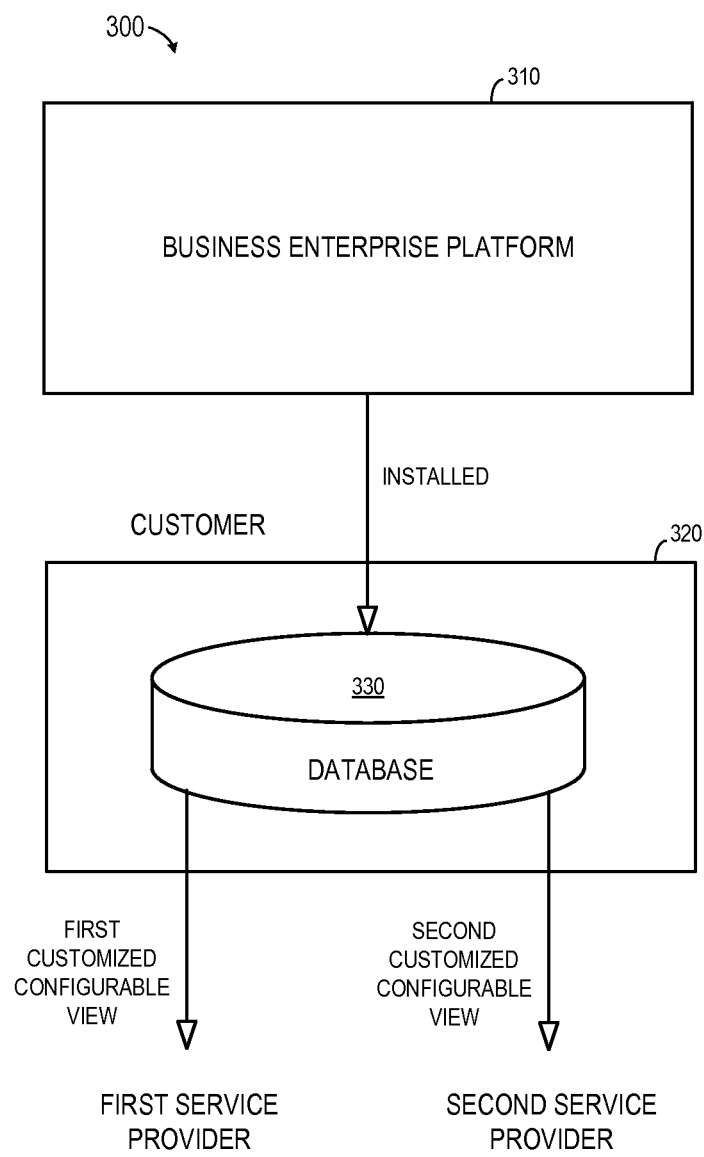
FIG. 3 is a block diagram of a system according to some embodiments.

In this way, different service providers may have different views of information in a database. For example, FIG. 3 is a block diagram of a system 300 according to some embodiments. As in FIG. 1, the system 300 includes a business enterprise platform 310 that has installed a database 330 at or for a customer 320. In some cases, the customer 320 may wish to share information from the database 330 with various service providers in different ways. For example, as illustrated in FIG. 3, the customer 320 might want a first service provider to have a first customized configurable view of the database 330 while a second service provider has a second customized configurable view of the same database 330. Note that different databases do not need to be maintained for different service providers.

Figure 4:
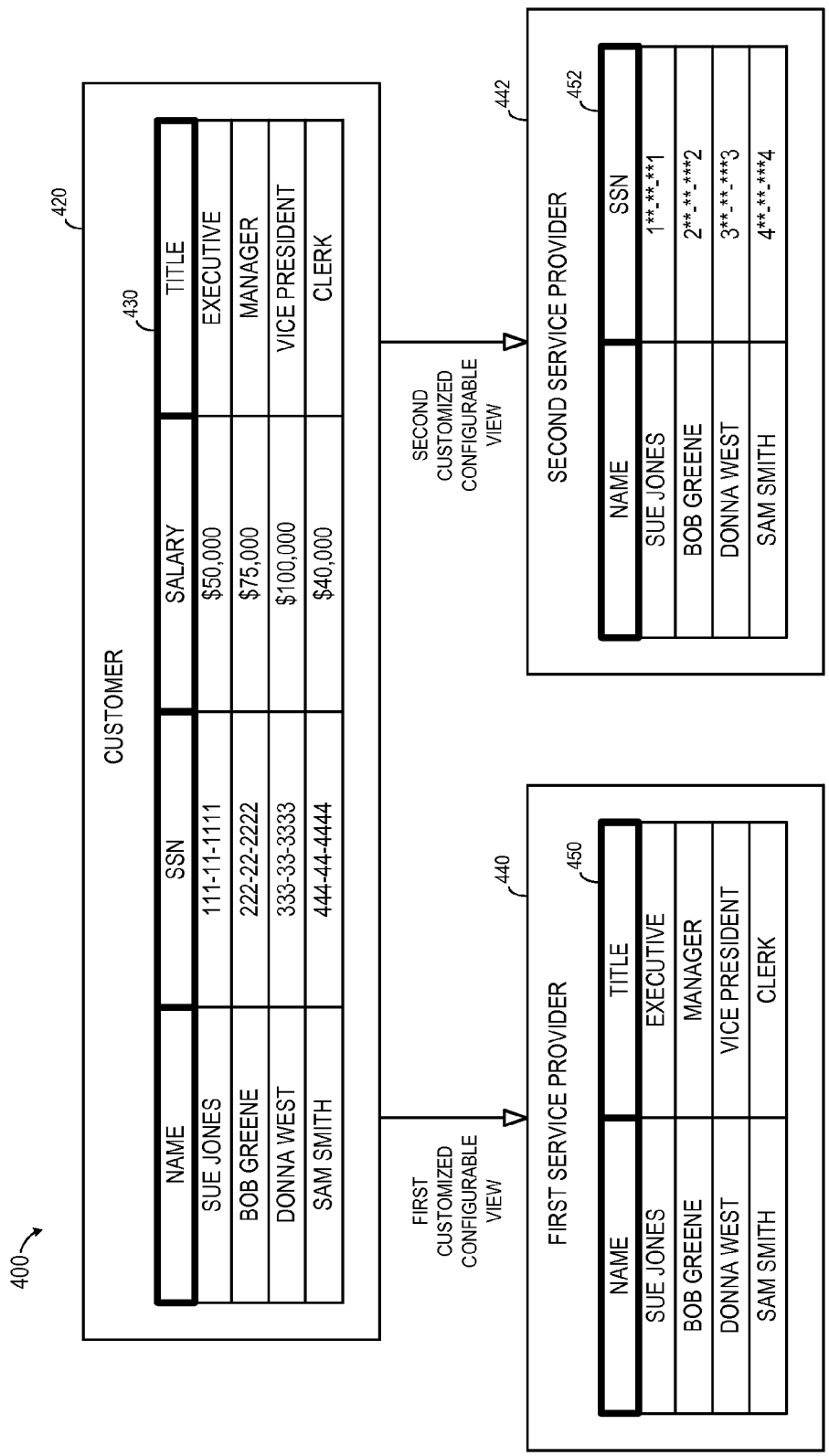
FIG. 4 illustrates a database and database views in accordance with some embodiments.

FIG. 4 illustrates 400 a database and database views in accordance with some embodiments. In particular, a customer 420 has a database 430 that was installed by a business service enterprise. The database 430 includes, by way of example, names, Social Security numbers, salaries, and titles of the customer's employees or clients.

A first service provider 440 has a first customized configurable view 450 of the information in the customer's database 430. As illustrated in FIG. 4, the first customized configurable view 450 includes names and titles but not Social Security numbers or salaries. Likewise, a second service provider 442 has a second customized configurable view 452 of the information in the customer's database 430. As illustrated in FIG. 4, the second customized configurable view 452 includes names and portions of Social Security numbers but not titles or salaries.

Thus, some embodiments may benefit a customer with a set of data stored in a database who wishes to distribute various versions of the data to different applications ("service providers") internally or externally to the customer's enterprise. That is, the original data may be modified before being published to service providers. The reasons might include, for example, security (not exposing sensitive or proprietary information), localization of data (e.g., changing "England" to "USA"), data filtering (changing an amount of data presented to match the end user's needs), data correction (e.g., changing "US" to "USA"), and/or any other customer-defined modifications and/or user requirements.

Moreover, some embodiments may allow a customer to make various changes to data before it is ported to an end user without a deep understanding of SQL techniques or the underlying database tables upon which the data resides. According to some embodiments, these capabilities may be built on CalcViews and/or CalcEngines associated with flexible, multipurpose in-memory computing software such as the HANA® platform and database available from SAP AG®.

According to some embodiments, a CalcView may provide a view of information in a database such that modifications may be nearly instantaneous and require no pre-processing. Using the CalcView, customers may view the original data simultaneously, each seeing their own version of the data based upon a configuration and instantiation of the CalcView. Moreover, changes made in the original data may viewed instantaneously by a customer after the modification has occurred. The CalcView may be provided with a library of pre-defined functionality, such as encrypt(user-provided key), randomize( ), toLowerCase( ), replace( ), remove( ), etc., along with an interface to provide customer-designed functionality enabling a full "duplex" mechanism.

According to some embodiments, a configurable view may be initially configured to provide data "as-is" and be provided with a relatively simple ability to filter out certain columns. Similarly, rows might be filtered out by limiting row quantity, adding a where-type clause to remove data, etc. Moreover, an application may provide a user with methods of making common changes (and another interface to provide more complicated changes can also be provided).

Note that a CalcEngine may provide user-defined processing, including data manipulations (such as a sum of a column, a maximum value over a given quarter, data operations based on multiple columns, etc.) that can be made per customer requirements. According to some embodiments the changes may be made simply by a client and may be compatible a wide variety of processing types.

Consider a customer interested in providing security by encrypting data. Assumer, for example, that the encryption key is "19." As a result, the customer may initiate a CalcView which contains the key (19) as an input parameter. Note that access to a CalcView may require user name and password parameters (and the validation of the user name/password may be performed in the CalcView in connection with an authentication database) and might be performed as follows:

initiate calc view SHOW_DATA(19)
    select * from SHOW_DATA with param(user name, password)

Note that such an approach may for analytical queries where the processing time is substantially larger than the access time (and the time spent for validating the user name/password is relatively short).

According to some embodiments, a CalcView may provide an ability to determine results of what-if scenarios. For example, a customer may change the view of the data by accessing CalcView building blocks (e.g., to double revenues from a specific region) and run analytical queries against this CalcView. This might, for example, enable a customer to prioritize investments according to the expected impact of the changes.

Figure 5:
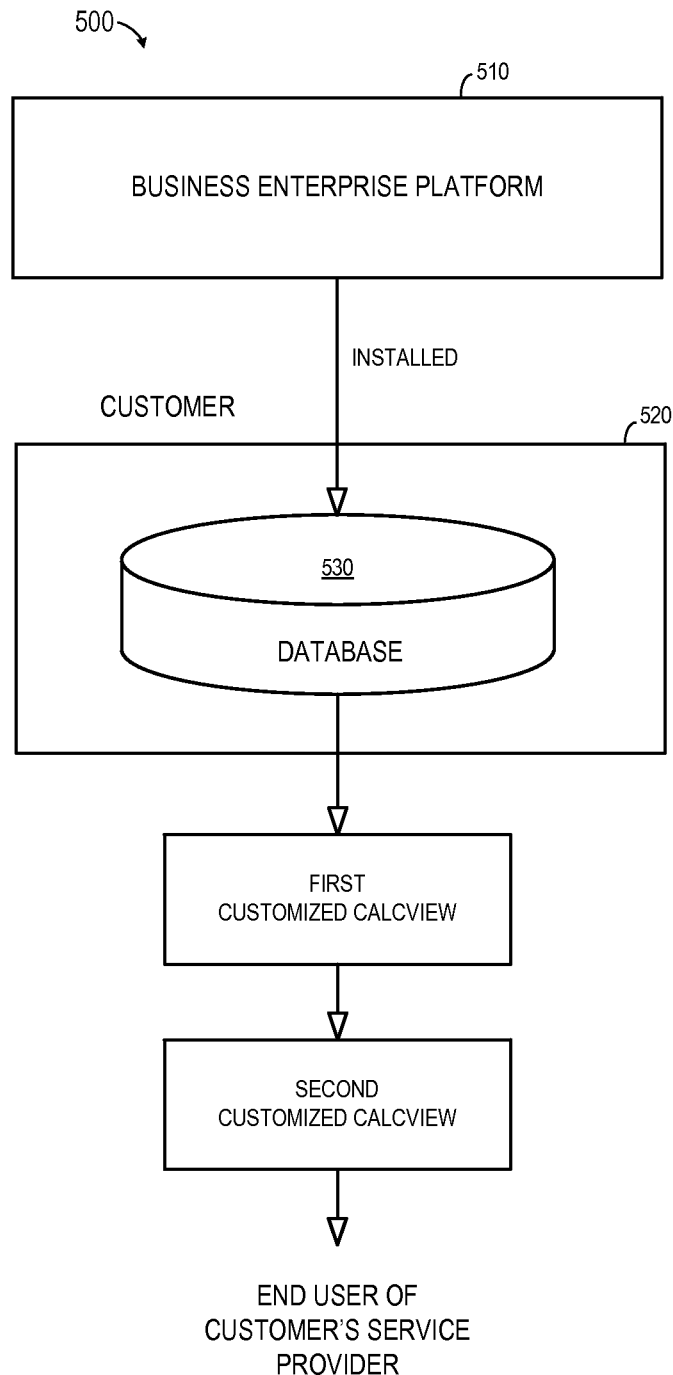
FIG. 5 is a block diagram of a system according to another embodiment.

Note that multiple CalcViews could be applied in connection with a single service provider. For example, FIG. 5 is a block diagram of a system 500 where a business enterprise platform 510 has installed a database 530 for a customer 520 according to another embodiment. In this case, information in the database 530 might pass through two customized CalcViews before being provided to a service provider (e.g., the first CalcView might remove some columns while the second CalcView performs a C++ encryption process on the remaining information).

Figure 6:
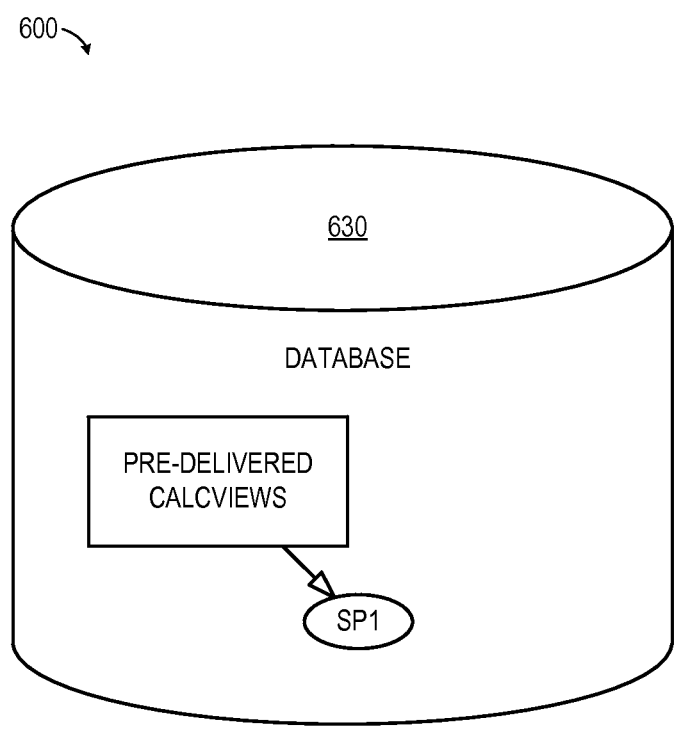
FIG. 6 illustrates a database supplied to a customer according to some embodiments.

FIG. 6 illustrates 600 a database 630 supplied to a customer according to some embodiments. For example, the database 630 might be shipped with pre-defined CalcViews to CUSTOMER_A. The pre-defined CalcViews might be associated with, for example, sum column operations, filters, aggregations and/or other column-wise operations (e.g., column Z=column X+column Y). According to some embodiments, the pre-defined CalcViews might be for encrypting and/or scrambling data called by a service provider (e.g., "SP1"), data enrichment, and/or support of multiple tenancy operations.

Consider, for example, what might happen if CUSTOMER_A is asked to supply test data to SERVICE_PROVIDER_A. In this case, SERVICE_PROVIDER_A might override SP1 and add an additional scramble SP which scrambles the data and enables this CalcView (that is, hooking his or her logic into the CalcView). CUSTOMER_A may then instantiate this CalcView and call it SERVICE_PROVIDER_A_VIEW. As a result, SERVICE_PROVIDER_A can simply run: select from SERVICE_PROVIDER_A_VIEW. As a result, there may be no need to create scrambled data—which may reduce the need for resource allocation (e.g., disks and database administrators). Moreover, there may be no need to maintain the data and close the connection between the data and the test data.

Figure 7:
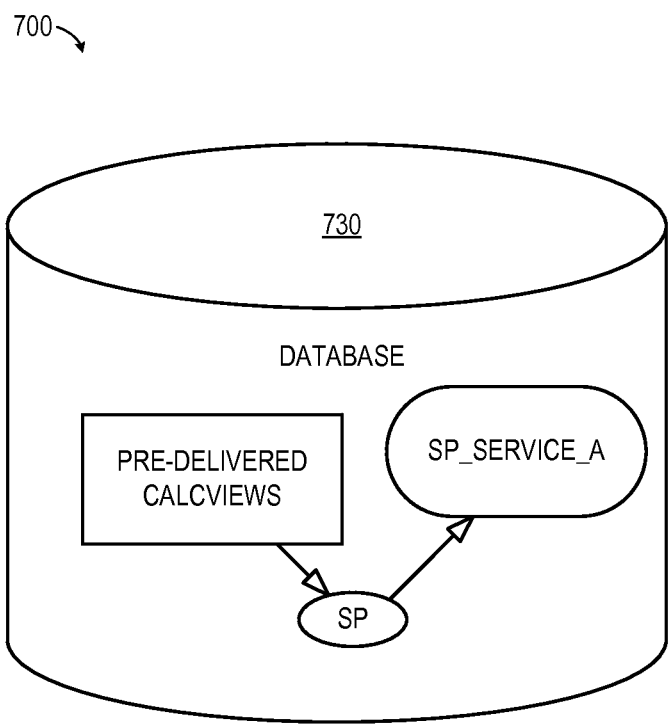
FIG. 7 illustrates a database supplied to a customer according to another embodiment described herein.

As another example, FIG. 7 illustrates 700 a database 730 supplied to a customer according to another embodiment described herein. In this approach, a service provider may be enabled to enrich data via a full duplex hooking technique. Consider, for example, what may happen when CUSTOMER_A is asked to supply a method in which one of his or her service providers (again, SERVICE_PROVIDER_A) is to enrich retrieved data without installing dictionaries in the database 730 as data. In this case, SERVICE_PROVIDER_A may initialize a CalcView as SP_SERVICE_A which will be called from the CalcView's SP.

Figure 8:
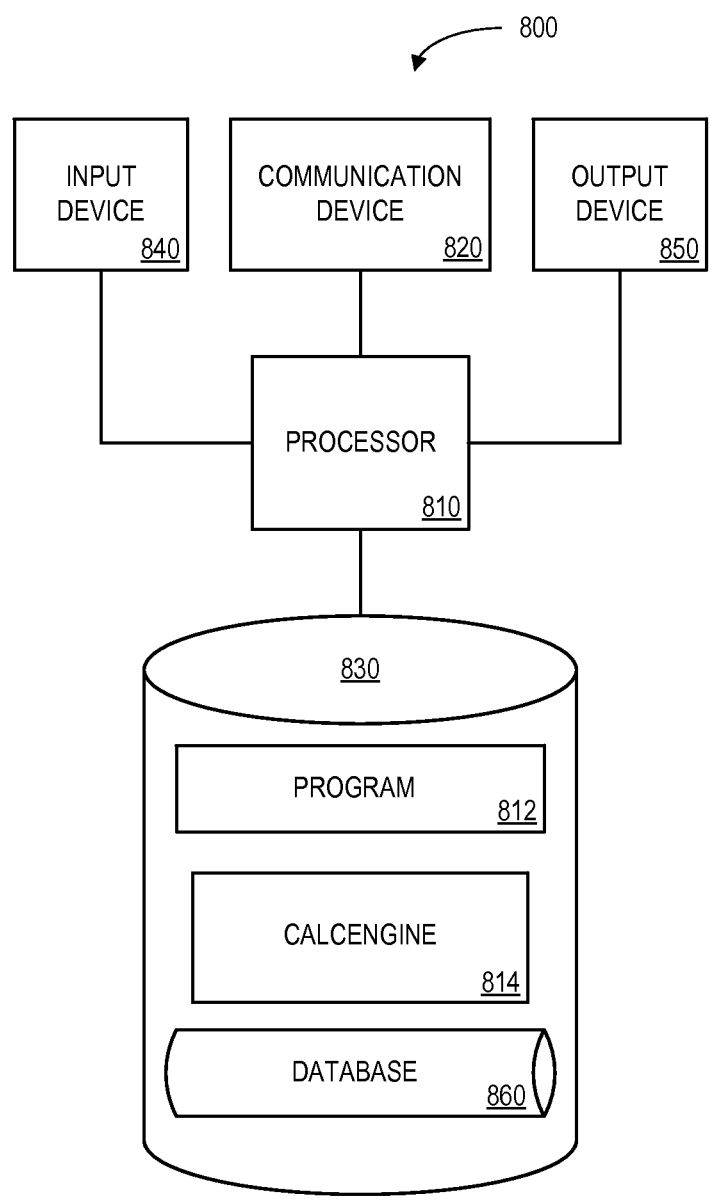
FIG. 8 is a detailed block diagram of a platform according to some embodiments.

The processes described herein may be performed by any suitable device or apparatus. FIG. 8 is one example of a platform 800 according to some embodiments. The platform 800 may be, for example, associated with some or all of the elements described in connection with system 100 of FIG. 1. The platform 800 comprises a processor 810, such as one or more commercially available Central Processing Units (CPUs) in the form of one-chip microprocessors, coupled to a communication device 820 configured to communicate via a communication network (not shown in FIG. 8). The communication device 820 may be used to communicate, for example, with one or more remote devices. The platform 800 further includes an input device 840 (e.g., a mouse and/or keyboard to enter customizations) and an output device 850 (e.g., a computer monitor to display customization tools to a customer and/or service provider).

The processor 810 also communicates with a storage device 830. The storage device 830 may comprise any appropriate information storage device, including combinations of magnetic storage devices (e.g., a hard disk drive), optical storage devices, and/or semiconductor memory devices. The storage device 830 stores a program 812 and/or CalcEngine 814 for controlling the processor 810. The processor 810 performs instructions of the programs 812, 814, and thereby operates in accordance with any of the embodiments described herein. For example, the processor 810 may support an installation of a customer's database 860 by a business enterprise platform. The processor may further support at least one pre-defined configurable view of the information in the database 860. Moreover, customization of the pre-defined configurable view of the information in the database 860 by the customer and/or a service provider may be automatically facilitated.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices. As used herein, information may be "received" by or "transmitted" to, for example: (i) the platform 800 from another device; or (ii) a software application or module within the platform 800 from another software application, module, or any other source.

In some embodiments (such as shown in FIG. 8), the storage device 830 stores the database 860. The database 860 may, for example, comprise a database that contains business information such as the data described in connection with FIG. 4. Note that the databases mentioned herein are only examples, and additional and/or different information may be stored therein. Moreover, various databases might be split or combined in accordance with any of the embodiments described herein.

Thus, embodiments described herein may provide an efficient mechanism for representing and implementing different views of a database. Moreover, the logic that can be implemented according to various embodiments may provide functionality that is not possible using traditional views. Further, embodiments may avoid persisting data (instead only materializing data when retrieved) to improve both hardware and time-based performance metrics.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and user interface configurations have been described herein, not that any number of other configurations may be provided in accordance with embodiments of the present invention (e.g., a business enterprise platform, customer device, and/or service provider device may be remote from each other or co-located). Applicants have discovered that embodiments described herein may be particularly useful in connection with certain types of business information. Note, however, that other types of information may also benefit from the invention.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer implemented method, the method comprising:
   installing, by a business enterprise platform, a database associated with a customer of the business enterprise platform;
   providing, from the business enterprise platform to the customer, at least one pre-defined configurable view of the information in the database; and
   automatically facilitating customization, by the customer, of the pre-defined configurable view of the information in the database for an end user of a service provider associated with the customer, wherein the pre-defined configurable view of the information in the database comprises a CalcView associated with a CalcEngine.

2. The method of claim 1, further comprising:
   customizing, by the end user of the service provider, the pre-defined configurable view of the information in the database.

3. The method of claim 2, further comprising:
   customizing, by another end user of another service provider, the pre-defined configurable view of the information in the database to create a plurality of customized views associated with the customer.

4. The method of claim 1, further comprising:
providing, from the business enterprise platform to another customer, the pre-defined configurable view of the information in the database;
customizing, by the other customer, the pre-defined configurable view of the information in the database for another end user of another service provider associated with the other customer.

5. The method of claim 1, wherein said customizing is associated with at least one of: (i) data security, (ii) a scrambling operation, (iii) data encryption, or (iv) a randomization function.

6. The method of claim 5, wherein said customizing is associated with at least one of: (i) a password, (ii) a user name, or (iii) a SHOW_DATA key value.

7. The method of claim 1, wherein said customizing is associated with at least one of: (i) a localization of information in the database, (ii) a correction of information in the database, (iii) a removal of information in the database, (iv) a replacement of information in the database, or (v) a database join operation.

8. The method of claim 1, wherein said customizing is associated with a data filtering operation.

9. The method of claim 8, wherein said data filtering operation is associated with at least one of: (i) a column-based filter, (ii) a row-based filter, or (iii) a filter rule.

10. The method of claim 1, wherein said customizing is associated with at least one of: (i) column sums, (ii) a maximum value over a period of time, (iii) a minimum value over period of time, or (iv) multi-column aggregations.

11. A system comprising:
a storage platform storing a database installed by a business enterprise platform, the database being associated with a customer of the business enterprise platform; and
a view engine associated with the customer, the view engine to: (i) receive from the business enterprise platform at least one pre-defined configurable view of the information in the database, and (ii) facilitate customization, by the customer, of the pre-defined configurable view of the information in the database for an end user of a service provider associated with the customer, wherein the at least one pre-defined configurable view of the information in the database comprises a CalcView associated with a CalcEngine.

12. The system of claim 11, wherein said customizing is associated with at least one of: (i) data security, (ii) a scrambling operation, (iii) data encryption, or (iv) a randomization function.

13. The system of claim 12, wherein said customizing is associated with at least one of: (i) a password, (ii) a user name, or (iii) a SHOW_DATA key value.

14. The system of claim 11, wherein said customizing is associated with at least one of: (i) a localization of information in the database, (ii) a correction of information in the database, (iii) a removal of information in the database, (iv) a replacement of information in the database, or (v) a database join operation.

15. The system of claim 11, wherein said customizing is associated with at least one of: (i) a data filtering operation, (ii) a column-based filter, (iii) a row-based filter, or (iv) a filter rule.

16. A non-transitory, computer-readable medium storing program code executable by a computer processor to perform a method, wherein execution of the code causes the computer processor to:
install, by a business enterprise platform, a database associated with a customer of the business enterprise platform;
provide, from the business enterprise platform to the customer, at least one pre-defined configurable view of the information in the database; and
facilitate customization, by the customer, the pre-defined configurable view of the information in the database for an end user of a service provider associated with the customer, wherein the pre-defined configurable view of the information in the database comprises a CalcView associated with a CalcEngine.

17. The medium of claim 16, wherein said customizing is associated with at least one of: (i) data security, (ii) a scrambling operation, (iii) data encryption, or (iv) a randomization function.

18. The medium of claim 17, wherein said customizing is associated with at least one of: (i) a password, (ii) a user name, or (iii) a SHOW_DATA key value.

19. The medium of claim 16, wherein said customizing is associated with at least one of: (i) a localization of information in the database, (ii) a correction of information in the database, (iii) a removal of information in the database, (iv) a replacement of information in the database, or (v) a database join operation.

20. The medium of claim 16, wherein said customizing is associated with at least one of: (i) a data filtering operation, (ii) a column-based filter, (iii) a row-based filter, or (iv) a filter rule.

* * * * *